June 13, 1933.   H. BURNS   1,913,361
ROLLING MILL
Filed Aug. 25, 1928   3 Sheets-Sheet 1
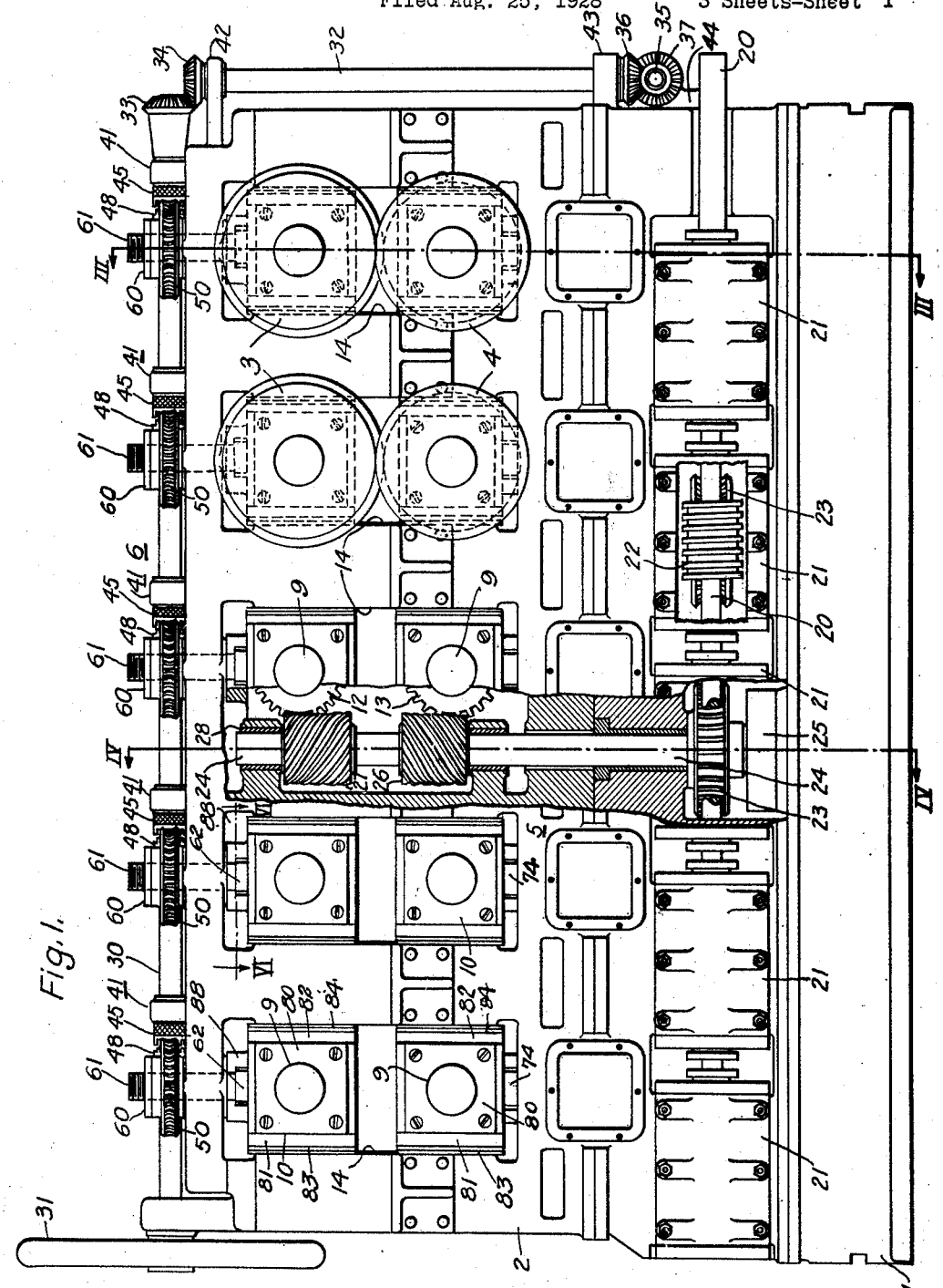
INVENTOR
Howard Burns
BY
William R. Coley
ATTORNEY

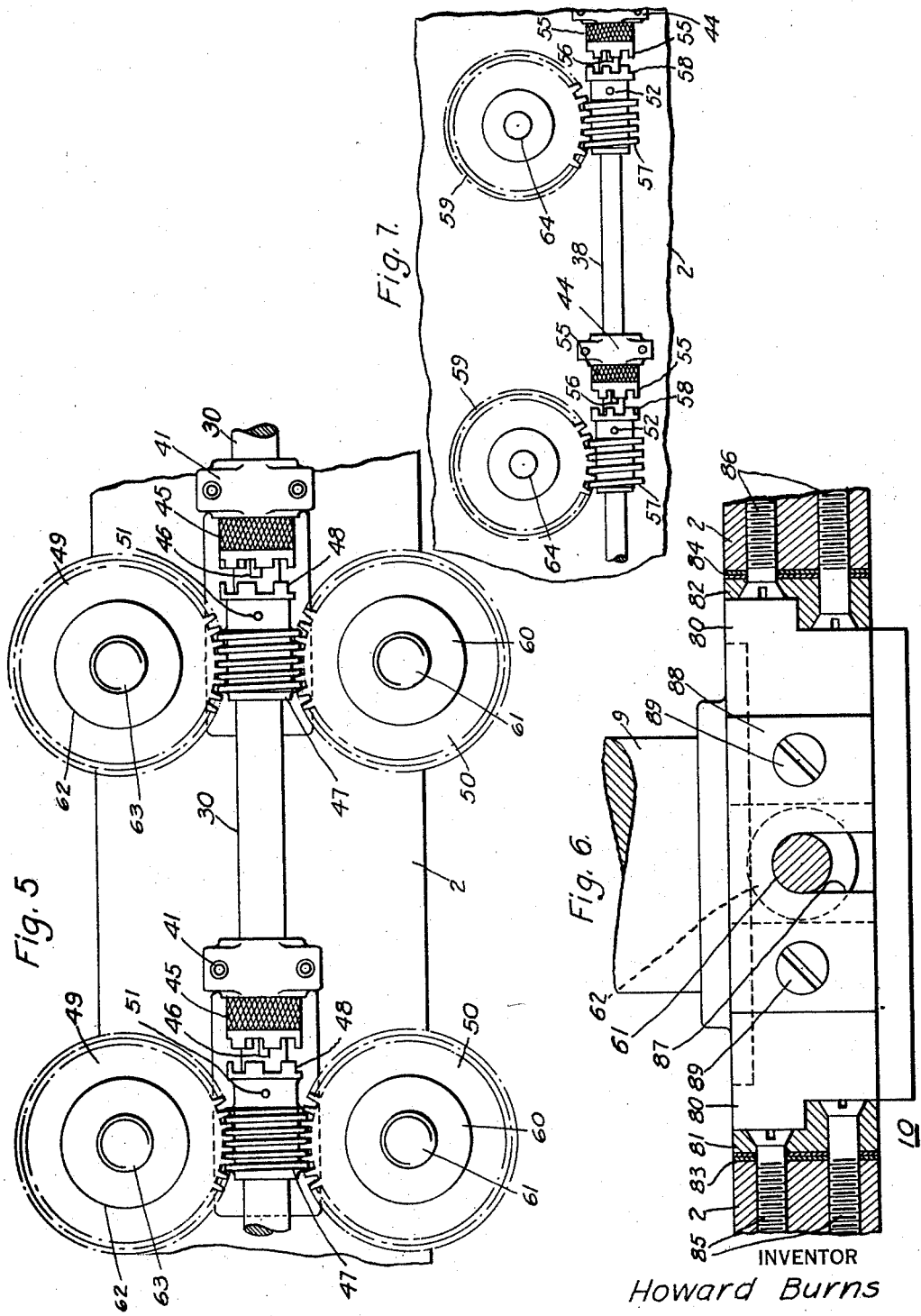

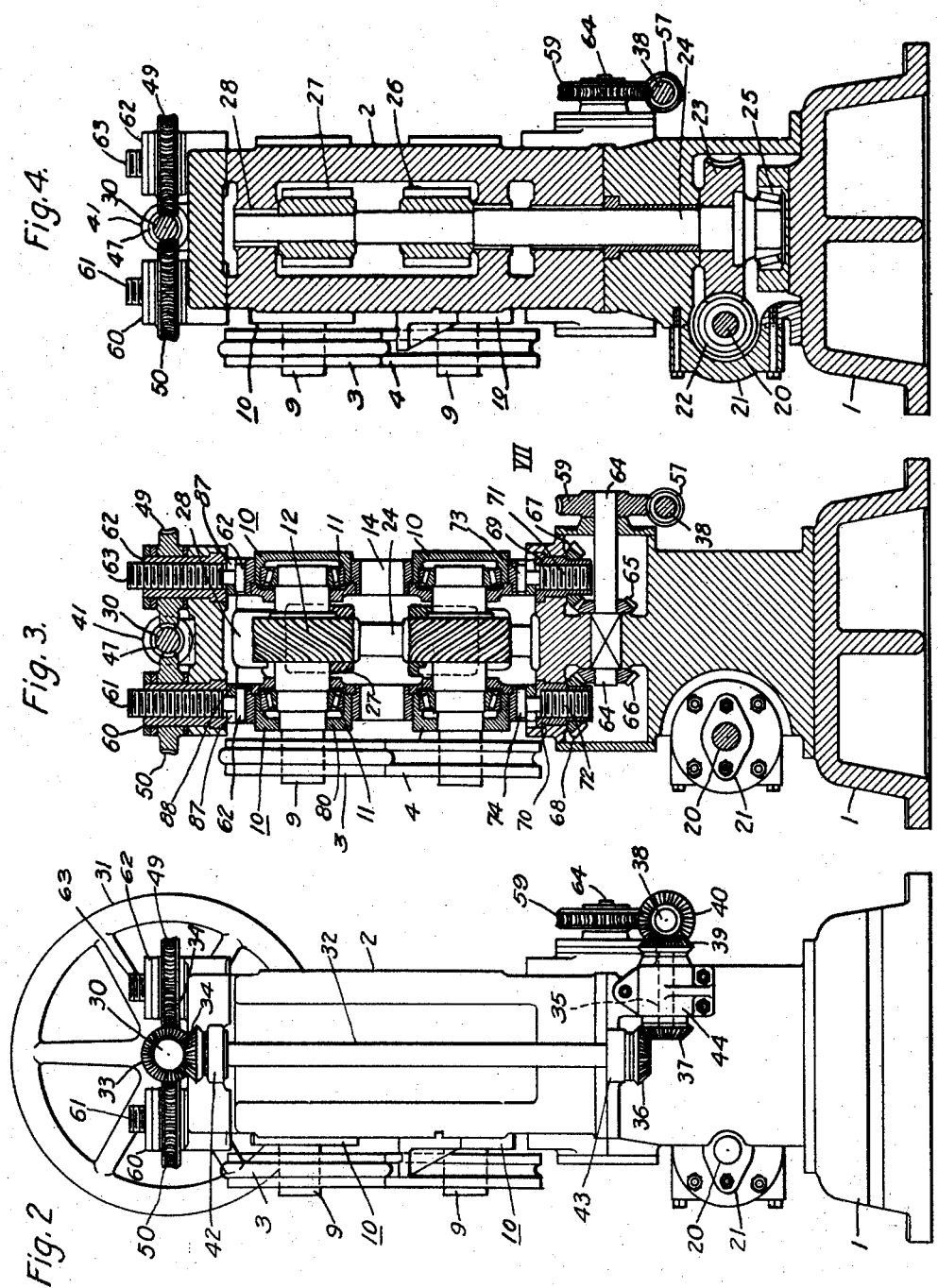

Patented June 13, 1933

1,913,361

UNITED STATES PATENT OFFICE

HOWARD BURNS, OF PITTSBURGH, PENNSYLVANIA, ASSIGNOR TO FORT PITT BEDDING COMPANY, A CORPORATION OF PENNSYLVANIA

ROLLING MILL

Application filed August 25, 1928. Serial No. 302,030.

My invention relates to rolling mills and similar structures and it has particular relation to cold rolling mill operations.

One object of my invention is to provide a rolling mill or the like having rolls adapted for individual adjustment and any number or combination of which may be selectively and simultaneously adjusted.

The second object of my invention is to provide, in a rolling mill of the usual type, wherein a plurality of pairs of mating rolls are employed, individual adjustments for either roll of each pair toward or away from its mating roll, any number or combination of the individual adjusting means being rendered effective at will.

Another object of my invention is to provide, in a rolling mill structure, movable plural means in the form of slidable clutch members for respectively rendering the several adjusting features effective or ineffective, together with a single control wheel or the like for effecting operation of any number or combination of the adjusting mechanisms when the corresponding clutches occupy their engaged positions.

Another object of my invention is to provide a common driving shaft or the like for the adjusting mechanisms, together with power transmitting devices for the several adjusting mechanisms respectively having releasable connections in the form of clutches, for example, with the driving shaft.

A further object of my invention is to provide an apparatus of the character in question embodying gear members secured to the adjusting devices, together with cooperating gear members severally having clutch jaws and adapted to coact with clutch jaws on a driving shaft or other member.

Still another object of my invention is to provide, in a rolling mill, driving gear members for the rolls having the property of remaining in fully operative meshing relation over wide variations in roll diameter.

More specifically stated, this object of my invention is to provide a helical gear drive for rolling mills, the helical gear members having a tooth angle such that the pitch diameters of the gear members remain tangent to each other, irrespective of any lateral movements of the rolls.

Another object of my invention is to provide a bearing structure for rolling mills or the like that is bodily shiftable in a vertical direction, for example, and which may also be slightly adjusted by means of shims in a lateral direction.

My invention may best be understood by reference to the accompanying drawings, wherein Figure 1 is a view, chiefly in elevation and partly in section, of a complete rolling mill embodying my present invention, Fig. 2 is a view, in end elevation, of the structure shown in Fig. 1, Fig. 3 and Fig. 4 are sectional views, taken along the lines III—III and IV—IV of Fig. 1, Fig. 5 is an enlarged view of the upper clutch and gear structure illustrated in Fig. 1, Fig. 6 is an enlarged view, partially in section, taken along the line VI—VI of Fig. 1, of a bearing detail of the apparatus shown in Fig. 1, and Fig. 7 is an enlarged view, similar to Fig. 5, of another portion of the rolling mill shown in Fig. 1.

Referring to the drawings, the structure here shown comprises a suitable base or supporting member 1, and a frame structure 2 mounted thereon for supporting a plurality of alined pairs of rolls 3 and 4, each pair being driven by a power transmitting gear mechanism 5 and being selectively adjustable through the agency of a manually controlled clutching apparatus 6, as hereinafter described in detail.

The base 1 and the frame or body portion 2 may be of any suitable character, the frame being provided with elongated side openings 14 for a purpose to be set forth.

Each roll 3 or 4 is mounted in accordance with usual practice upon one end of the respective driving shafts 9, which are mounted in a suitable stationary bearing structure or journal 10 through the agency of roller bearings 11. Intermediate the ends of each shaft 9 corresponding to the upper rolls 3 is mounted a helical driving gear 12, the tooth angle thereof being substantially 45°, for a purpose to be hereinafter set forth. A corresponding helical gear 13 having its teeth extending at right angles to those of gear 12 is mounted in alinement therewith on each shaft 9 corresponding to the lower rolls 4.

Power for operating the rolls may be obtained from any suitable source, which is coupled to shaft 20. This shaft extends along one side of the frame 2 near the base 1, being suitably supported in journal boxes 21 which house a worm 22 that meshes with a worm wheel 23, which is mounted upon a vertical shaft 24 having its lower end supported by a suitable thrust bearing 25 that is mounted on the central portion of the base 1. The upper half of each shaft 24 is provided with a helical gear 26 for meshing with its mating gear 13 and a helical gear 27 for meshing with its mating gear 12. The helical gears 26 and 27 also have tooth angles of substantially 45°, and this feature constitutes an important element of the present invention, as about to be described. The upper end of each shaft 24 is mounted in a suitable bearing 28 that is supported by a portion of the frame 2.

It will be understood that wear on the rolls 3 and 4 must be compensated for by vertically adjusting the position of the rolls, which is the function of mechanism 6, as later described in detail, and, in all present rolling mills with which I am familiar, the rolls must be discarded after only a relatively slight diminution in the diameters thereof, primarily for the reason that the power transmission mechanisms for the rolls, specifically the driving gear connections therefor, no longer remain in proper mesh as the roll diameter decreases; and the teeth of the gears mounted on the roll shaft thus recede from, or no longer remain in proper engagement with, the teeth of the gears on the driving shaft. In my invention, the rolls may still be fully utilized, even when the diameter thereof has decreased to approximately fifty per cent of its original value, by reason of the fact that the pitch diameters of the pairs of meshing gears, such as 12 and 27 or 13 and 26, always remain tangent to each other in spite of the variations of roll diameter within the range specified, or the vertical adjustments of the roll to produce the proper thickness of stock being passed through the mill.

I accomplish this result by utilizing helical gears of substantially 45° tooth angle, whereby not only is a considerable vertical range of adjustment of the rolls and roll gears permitted under normal conditions, but even after the rolls have worn to a fraction of their original diameter, the mating gears still remain in fully operative meshing relation, since the gear teeth simply slide along each other and the gear pitch diameters at all times remain tangent to each other.

The operating and maintenance advantages of this improved structure will be obvious.

The adjusting mechanism 6 comprises a driving shaft aggregate embodying a shaft 30 that extends along the upper side of the mill and is provided with a hand wheel or the like 31 at one end, a shaft 32 that extends vertically along one end of the mill and which is connected to shaft 30 through a pair of meshing bevel gears 33 and 34, a stub shaft 35 which extends at right angles to the shaft 32 and is connected thereto by suitably meshing bevel gears 36 and 37, and a shaft 38 that extends along the lower rear side of the frame 2, as viewed in Fig. 1, and which is connected to the stub shaft 35 by meshing bevel gears 39 and 40. To suitably and operably support the shafts 30, 32, 35 and 38, suitable bearings or journal members 41, 42, 43 and 44 are mounted on appropriate portions of the frame 2, as illustrated.

Consequently, by rotating the hand wheel 31, movements of the shafts 30, 32, 35 and 38 in the one or the other direction may be accomplished at will.

Referring particularly to Fig. 1 and Fig. 5, it will be seen that the shaft 30 is provided with a plurality of knurled clutch jaws 45 which are adapted to rotate with the shaft, but slide therealong by reason of the provision of suitable keys or splines 46 in the shaft. A corresponding number of worms 47, each of which is provided with a clutch jaw 48, are loosely mounted on the shaft 30, each being held from play longitudinally by a pin 51 that rotates in a suitable groove on the shaft, and are disposed in operative proximity to the corresponding clutch jaws 45, whereby through manual operation of any number or combination of the clutch jaws 45, the corresponding worms 47 may be operatively secured to, and be driven by, the shaft 30. Meshing with each worm 47 is a pair of worm gears 49 and 50 which, when driven through the agency of the corresponding worm 47, serve to vertically adjust the position of the corresponding upper roll 3, as subsequently more fully described.

A similar structure is employed in connection with the shaft 38, which is provided at the proper intervals with knurled clutch jaws 55 that are rotatable with the shaft and slide therealong by reason of the provision of suitable keys or splines 56. A plurality of worms 57 are loosely mounted upon the shaft 38, each being held from play longitudinally by a pin 52 that rotates in a suitable groove in the shaft, and are provided with clutch jaws 58 for meshing with the corresponding clutch jaws 55 when the latter are manually moved to thereby effect driving of the corresponding worm by the rotation of the shaft 38. Each worm 57 is adapted to drive a worm gear 59 for the purpose of vertically adjusting the corresponding lower roll 4, as hereinafter described in detail.

The upper worm gear 50 is rigidly secured to a collar or shell 60, which is internally threaded to engage an externally-threaded rod or pin 61 that extends vertically downward and terminates in an enlarged head 62 that is operatively associated, as hereinafter described, with the bearing structure or journal 10 of the corresponding roll shaft 9. Similarly, the worm gear 49, which, together with worm gear 50, is driven by the corresponding worm 47, is mounted upon an internally-threaded shell or sleeve 62 that engages an externally threaded rod or pin 63. This pin likewise terminates in an enlarged head 62 that is operatively associated with the bearing structure or journal 10 at the other end of the corresponding roll shaft 9.

Consequently, operation of the hand wheel 31 rotates the shaft 30 and the worms 47 in the one or the other direction if the corresponding clutch jaws 45 have been actuated into engagement with the clutch jaws 48 on the worms, whereby the worm gears 49 and 50 are simultaneously rotated and the threaded rods or pins 61 and 63 are actuated upwardly or downwardly to correspondingly shift or adjust the vertical position of the corresponding roll shaft or shafts 9.

Each worm 57 on shaft 38 meshes with a worm gear 59, as previously described, the latter being mounted on a shaft 64 that is suitably journaled in the frame 2 and is provided with two bevel gears 65 and 66 that respectively mesh with other bevel gears 67 and 68, the latter gears being rigidly secured to sleeve or shell members 69 and 70 that are internally threaded to engage externally-threaded pins or rods 71 and 72. The threaded pins or rods 71 and 72 extend upwardly and terminate in enlarged heads 73 and 74 that are operatively associated with the corresponding bearing structures or journals 10 for the corresponding lower roll shaft 9.

Consequently, by rotating the shaft 38 through the agency of hand wheel 31, each worm 57 that has been clutched with the corresponding drive shaft clutch jaws 55 will be turned in a corresponding direction to thereby rotate the meshing worm gear 59 and thus operate the threaded rods or pins 71 and 72 in an upward or downward direction to correspondingly elevate or lower the associated roll shaft 9 and roll 4.

Consequently, by operation of any number or combination of the drive shaft clutches 45 and 55, any selected upper or lower roll 3 or 4, or any number or combination of such rolls, mating or non-mating in relation to others, may be shifted upwardly or downwardly as desired. On the other hand, wherever a worm 47 or 57 is not so clutched, the corresponding shaft 30 or 38 merely turns therewithin and no actuation of the corresponding upper or lower roll is effected.

In addition to the lateral adjustment of the rolls just described in an upward or downward direction, I have provided for lateral adjustment in a direction at right angles thereto, for the purpose of taking up the wear of the rolls or to maintain perfect alinement of each pair thereof. The improved structure for accomplishing this purpose is shown in Fig. 6.

The bearing structure or journal 10 is there shown as comprising a stepped block 80 that fits in correspondingly stepped smaller members or blocks 81 and 82, on the outer edges of which suitable adjustable shims 83 and 84 are positioned. Suitable screws or other fastening members 85 and 86 are provided for securing the smaller blocks 81 and 82 respectively to the adjacent portions of the frame structure 2.

A slot 87 in a top cover plate 88 is adapted to embrace the inner end of the threaded rod or pin, such as 61, the enlarged head 62 thereof fitting below the slot 87 and thus being held in its proper position. The top plate 88 may be secured in position upon the main block 80 by means of screws 89 or the like.

To provide lateral adjustment of any given roll, the corresponding stepped block 80 and roll shaft 9, or both, may be removed along the planes of contact of the various illustrated steps and in the direction thereof, (that is, up or down the steps), thereby exposing the ends of the screws 85 and 86. After loosening these screws and then eliminating or adding shims 83 and 84, of varying thickness, as desired, to provide for shifting the stepped block 80 in the one direction or the other, the screws 85 and 86 may again be tightened in such position as to leave the proper distance between the confronting faces of the smaller stepped blocks 81 and 82. The large stepped block 80 may then be slid back into place and the mill is again ready for operation. It will be understood that similar adjustments may be made in any of the upper or lower rolls, as desired, to afford any necessary lateral adjustment in a position at right angles to the vertical adjustment provided by the mechanism 6.

It will be seen that I have thus provided a rolling mill structure wherein any number or combination of the rolls may be selectively and simultaneously adjusted at will and wherein the rolls may also be laterally adjusted in a direction at right angles to the main adjustment. Furthermore, by reason of the provision of the 45° helical gears for driving the rolls, replacements of the rolls for wear may be much less frequent than was formerly the case, and, at the same time, fully operative meshing relation of the roll-driving gears is always maintained.

While I have shown and described a preferred embodiment of my invention, I do not wish to be restricted to the structural details or arrangement of parts herein illustrated, as various modifications thereof may be made without departing from the spirit and scope of my invention. I desire, therefore, that only such limitations shall be imposed as are indicated in the appended claims.

I claim as my invention:

1. The combination with a plurality of pairs of mating rolls and means for individually adjusting said rolls, of means for actuating certain of said first-named means for effecting adjustment of any one of said rolls from a common point and for simultaneously effecting adjustment of any combination of mating or non-mating rolls.

2. The combination with a plurality of pairs of mating rolls, of gear means for individually adjusting either roll of each pair toward or away from its mating roll, movable plural clutch means for respectively rendering the several adjusting means effective or ineffective, and a single manual means for effecting operation of any number or combination of said adjusting means when the corresponding ones of said plural clutch means occupy predetermined positions.

3. The combination with a plurality of pairs of mating rolls, of means for individually adjusting either roll of each pair toward or away from its mating roll, slidable clutch members for respectively rendering the several adjusting means effective or ineffective, and a single manually actuable device for effecting operation of any number or combination of said adjusting means when the corresponding clutches occupy their engaged positions.

4. The combination with a plurality of pairs of mating rolls, of means for individually adjusting either roll of each pair toward or away from its mating roll, a common driving means for said adjusting means, and power-transmitting mechanisms for the several adjusting means respectively having releasable connections with said driving means.

5. The combination with a plurality of pairs of mating rolls, of means for individually adjusting either roll of each pair toward or away from its mating roll, a common driving means for said adjusting means, gear trains for respectively actuating the several adjusting means, and clutch devices for selectively connecting said gear trains to said driving means.

6. The combination with a plurality of pairs of mating rolls, of means for individually adjusting either roll of each pair toward or away from its mating roll, a common driving-shaft aggregate for said adjusting means, a plurality of pairs of meshing gear members respectively associated permanently with said adjusting means and detachably with said driving-shaft aggregate.

7. The combination with a plurality of pairs of mating rolls, of means for individually adjusting either roll of each pair toward or away from its mating roll, a common driving-shaft aggregate for said adjusting means, a plurality of worm members loosely associated with said driving-shaft aggregate, a plurality of worm gear members permanently associated with the respective adjusting means and operatively meshing with the corresponding worm members, and means for connecting the respective worm members with said driving-shaft aggregate.

8. The combination with a plurality of pairs of upper and lower mating rolls having shiftable bearings, of threaded members attached to the respective bearings, worm gears for effecting longitudinal movement of said threaded members, a plurality of shafts respectively located above said upper rolls, below said lower rolls and at one side of the last pair of rolls, bevel gears for connecting said shafts, worms loosely mounted on said shafts and engaging the respective worm gears, and clutches for securing the respective worms to the corresponding shafts.

9. The combination with a plurality of pairs of mating rolls, of means for individually adjusting either roll of each pair toward or away from its mating roll, a common driving means for said adjusting means, gear members secured to said adjusting means, cooperating gear members loosely associated with said driving means and severally having clutch jaws, and a plurality of coacting clutch jaws on said driving means.

10. The combination with a plurality of pairs of mating rolls, of means for individually adjusting either roll of each pair toward or away from its mating roll, a common driving-shaft aggregate for said adjusting means and having a plurality of slidable clutch jaws rotatable therewith, a plurality of worm gears permanently associated with the respective adjusting means, and a plurality of worms loosely mounted on said driving-shaft aggregate and meshing with the respective worm gears, said worms having clutch jaws for coacting with the respective slidable clutch jaws on said driving-shaft aggregate.

11. The combination with a roll and a helical gear member rigidly associated therewith, of a driving shaft for said roll and a cooperating helical gear member rigidly associated with said shaft, said helical gear members having a tooth angle of substantially 45°, thereby to permit the gear members to remain in fully operative meshing relation over wide variations in roll diameter.

12. The combination with a roll and a helical gear member rigidly associated therewith, of a driving shaft for said roll located at substantially right angles thereto and a cooperating helical gear member rigidly associated with said shaft, said helical gear members having a tooth angle of substantially 45°, thereby to permit the gear members to remain in fully operative meshing relation over wide variations in roll diameters.

13. The combination with a bearing structure comprising a plurality of stepped members, an additional stepped member bodily shiftable along the planes of contact therewith, and means for adjusting the positions of said plurality of stepped members in a direction transverse to said planes after said additional stepped member has been moved in the direction of the steps.

14. The combination with a guiding frame member, of a bearing structure comprising a plurality of stepped members detachably secured to said frame member, an additional stepped member bodily slidable along the planes of contact with said plurality of stepped members, and means for adjusting the final position of said additional stepped member in a direction at substantially right angles to said planes comprising adjusting shims adapted to be located between each of said plurality of stepped members and said frame member after said additional stepped member has been moved in the direction of the steps.

15. The combination with a bearing structure comprising a plurality of stepped members, an additional stepped member bodily shiftable along the planes of contact therewith, means for adjusting the positions of said plurality of stepped members in a direction transverse to said planes after said additional stepped member has been moved in the direction of the steps, and securing members extending in substantial alinement with the respective co-acting steps.

16. The combination with a guiding frame member, of a bearing structure comprising a plurality of stepped members detachably secured to said frame member, an additional stepped member bodily slidable along the planes of contact with said plurality of stepped members, means for adjusting the final position of said additional stepped member in a direction at substantially right angles to said planes comprising adjusting shims adapted to be located between each of said plurality of stepped members and said frame member after said additional stepped member has been moved in the direction of the steps, and securing members extending outwardly through the respective steps of said plurality of stepped members into said frame member.

17. The combination with a plurality of pairs of mating rolls adapted for individual adjustment, of means for adjusting any predetermined pair of rolls or any predetermined individual roll, and means for effecting said adjustment, from a common point, of all rolls so predetermined.

In testimony whereof, I have hereunto subscribed my name this 14th day of August, 1928.

HOWARD BURNS.